United States Patent [19]
Suzuki et al.

[11] Patent Number: 5,471,226
[45] Date of Patent: Nov. 28, 1995

[54] COORDINATE INPUT APPARATUS AND CALIBRATION METHOD FOR THE SAME

[75] Inventors: Noriyuki Suzuki, Tokyo; Shinsuke Takeuchi, Yokohama, both of Japan

[73] Assignee: Canon Kabushiki Kaisha, Tokyo, Japan

[21] Appl. No.: 958,454

[22] Filed: Oct. 7, 1992

Related U.S. Application Data

[63] Continuation of Ser. No. 499,986, Mar. 27, 1990, abandoned.

[30] Foreign Application Priority Data

Mar. 27, 1989 [JP] Japan .................................. 1-71897

[51] Int. Cl.$^6$ .................................................. G09G 3/02
[52] U.S. Cl. ........................ 345/173; 345/178; 178/18
[58] Field of Search ................................ 340/706, 709, 340/707; 178/18, 19, 20; 345/173, 178

[56] References Cited

U.S. PATENT DOCUMENTS

| | | | |
|---|---|---|---|
| 4,587,520 | 5/1986 | Astle | 340/712 |
| 4,710,758 | 12/1987 | Mussler et al. | 340/712 |
| 4,737,773 | 4/1988 | Kobayashi | 340/706 |
| 4,745,565 | 5/1988 | Garwin et al. | 178/18 |
| 4,752,655 | 6/1988 | Tajiri et al. | 178/20 |
| 4,886,943 | 12/1989 | Suzuki et al. | 178/340 |
| 4,903,012 | 2/1990 | Ohuchi | 340/709 |
| 4,972,496 | 11/1990 | Sklarew | 178/18 |

FOREIGN PATENT DOCUMENTS

| | | |
|---|---|---|
| 0121250 | 10/1984 | European Pat. Off. . |
| 0199243 | 10/1986 | European Pat. Off. . |
| 3540626 | 5/1986 | Germany . |
| 62-47725 | 7/1985 | Japan .................. 345/173 |
| 61-6728 | 1/1986 | Japan .................. 345/173 |

*Primary Examiner*—Ulysses Weldon
*Assistant Examiner*—Amare Mengistu
*Attorney, Agent, or Firm*—Fitzpatrick, Cella, Harper & Scinto

[57] ABSTRACT

A coordinate input apparatus includes a coordinate input member for inputting the coordinate value of an indicated position by pointing to a desired position with an indicating pen, a display device for displaying in dot form the indicated position of the indicating pen on the coordinate input member, an instruction device for instructing a calibration process for matching the coordinate systems of the coordinate input member and the display device, a correction parameter derivation device for deriving a correction parameter for matching coordinate systems on the basis of the indication by the indicating pen to a specific region of the coordinate input member when the instruction device has instructed, a coordinate value derivation device for deriving the coordinate value of the indicated position of the indicating pen to the specific region by using the correction parameter derived by the correction parameter derivation device, and a judgment device for judging the validity of the correction parameter according to whether or not the coordinate value derived by the coordinate value derivation device belongs to the specific region.

4 Claims, 9 Drawing Sheets

COORDINATE INPUT APPARATUS AND CALIBRATION METHOD FOR THE SAME

This application is a continuation of application Ser. No. 07/499,986, filed Mar. 27, 1990, now abandoned.

BACKGROUND OF THE INVENTION

1. Field of the Invention

This invention relates to a coordinate input apparatus in which the coordinate input can calibrated.

2. Description of the Related Art

In recent years, a system which recognizes input handwritten characters, figures, etc. has attracted attention as the system that will play the role of the next-generation man-machine interface (hereinafter referred to as MMI). In this kind of handwriting recognition system, a configuration is often employed such that a coordinate input apparatus and a display apparatus are positioned so as to overlap and the trace of a hand-written character or figure as it is displayed on the display apparatus. Such a configuration enables a character or a figure to be input exactly as if writing a note on paper.

A coordinate input apparatus which accepts data input by indicating on a tablet surface by means of a pen-like pointer is an indispensable input apparatus for use in a handwriting recognition system. Such an input apparatus accepts data input as the writing trace of a character or figure, and is also used for the indication and selection of icons and menus which are displayed on a screen or in a printed form in the environs of a screen. The selection of such icons or menus, by indicating, is a switch for starting the execution of a function or process corresponding to its icon or menu, so an icon or menu displayed on a screen is hereinafter called a soft switch.

Although a coordinate input apparatus and a display apparatus have coordinate systems separate from each other, in the case of a one-piece type configuration as mentioned above, respective coordinate systems need to be matched. What is more, coordinate systems of a coordinate input apparatus differ from one system to another, and therefore a calibration operation for matching coordinate systems is generally performed for each set. It is natural that this calibration operation be performed before shipment and at assembly time in a factory. Taking into account the secular change in the coordinate system of the coordinate input apparatus, it is made to be performed by the user.

Figure 9:
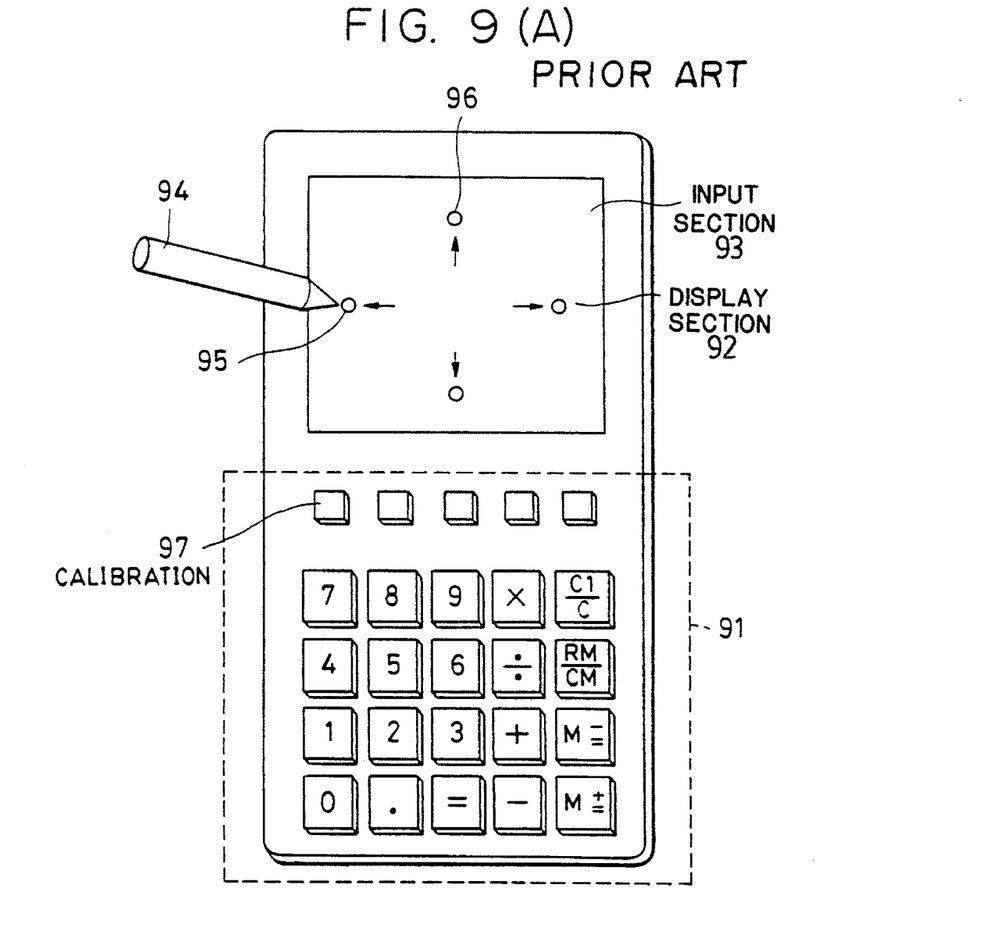
FIGS. 9(A) and 9(B) are views explaining the prior art.

Traditionally, this kind of calibration operation was performed as described below. This is shown in FIG. 9. FIG. 9(A) is an outer appearance of an electronic calculator which can input from a display screen. FIG. 9(B) is a view illustrating that a display section 92 and a coordinate input section 93 are formed in one piece. Now, when calibration operation start is instructed by pressing the calibration key 97 of the keyboard 91 shown in FIG. 9(A), a symbol for illustrating a press point is displayed on a specific point (e.g., 95, 96) in the display section 92. The operator indicates position, by pressing with the pen 94 directly onto this symbol. Such action is repeated for a plurality of points on a screen. The CPU (not shown) calculates the correction parameter from the difference between the display coordinate in the display section 92 and the detection coordinate in the coordinate input section 93 and stores it in a non-volatile storage section or the like. After this, correction is made by the above-mentioned parameter on the detection coordinate in the coordinate input section 93 and it is made a final input coordinate value. At this calibration operation time, if the operator erroneously indicates, by pressing, a position different from a display position, correct calibration cannot be made, and in the worst case, an input coordinate deviates greatly or is distorted and the coordinate input section 93 becomes inoperable. In such a case, as shown in FIG. 9, an electronic apparatus having a keyboard 91 can issue the instruction to start a calibration operation by means of a calibration key 97. However, an electronic apparatus having no input sections other than a coordinate input section, namely, an apparatus which inputs all indications by using icons displayed on a screen, has a problem in that if the coordinate input section becomes inoperable, nothing can be input, including the instruction to recalibrate. In recent years, because some users have an aversion to the keyboard, an electronic apparatus having no main input sections other than a coordinate input section in which the above-mentioned character recognition technology is adopted has attracted attention from the viewpoint of MMI. A method of reliably calibrating an input coordinate position in the coordinate input section of this kind of apparatus has been desired.

SUMMARY OF THE INVENTION

An object of the present invention is to provide a coordinate input apparatus in which a correction parameter of the above-mentioned coordinate remains undetermined when the operator has erroneously performed an operation in a coordinate calibration operation in a coordinate input apparatus.

Another object of the present invention is to provide a coordinate input apparatus to which an instruction to recalibrate may be issued at any time regardless of the success or failure of the first calibration and by which the operator can perform a calibration operation without any fear of making errors and feeling at ease.

A further object of the present invention is to provide a coordinate input apparatus capable of safely updating the coordinate correction parameter and of preventing the apparatus from becoming inoperable because of an erroneous operation in a coordinate calibration operation in a coordinate input apparatus.

These and other objects, features and advantages of the present invention will become clear by the following description of a preferred embodiment of the present invention with reference to the accompanying drawings.

BRIEF DESCRIPTION OF THE DRAWINGS

FIGS. 4a–c is a view illustrating a method of detecting a coordinate position in a resistance film system;

DETAILED DESCRIPTION OF THE PREFERRED EMBODIMENTS

The preferred embodiment of the present invention will be explained hereinunder in detail with reference to the accompanying drawings.

Explanation of an Electronic Apparatus (FIGS. 1 to 4)

Figure 2:
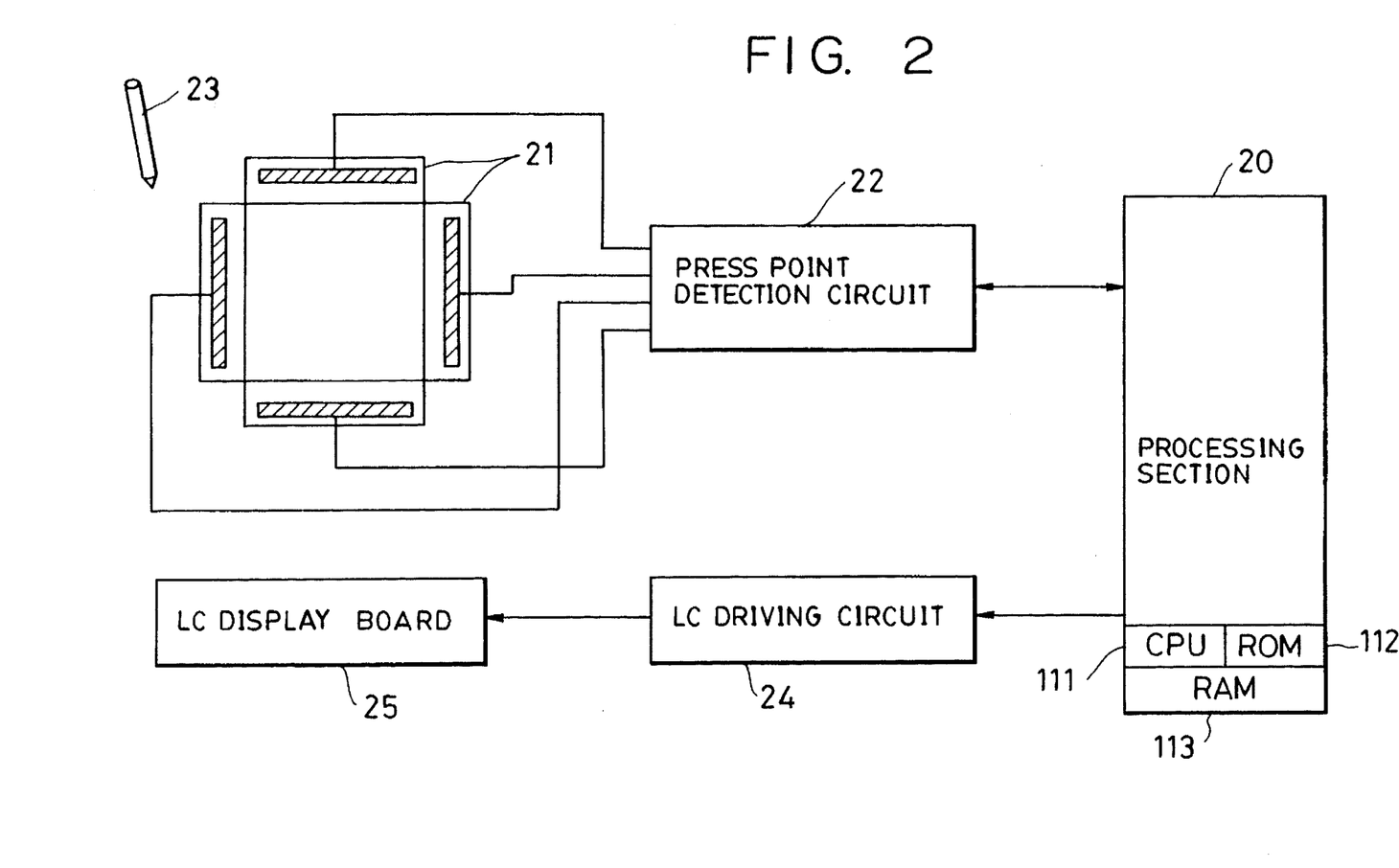
FIG. 2 is a block diagram for illustrating the schematic configuration of an electronic apparatus having an input/output one-piece type apparatus.

FIG. 2 is a block diagram for illustrating the schematic configuration of an electronic apparatus having a one-piece type input and output section in which a coordinate input section is overlapped on a display section.

Shown in the figure is a transparent input tablet 21 in which a resistance film, a transparent electrode, etc. are used. It accepts coordinate inputs when a tablet surface position is indicated, by pressing, with an indicating pen 23. The input tablet 21 is formed of a glass plate in which a resistance film is formed by depositing or printing a material such as ITO, etc. and a PET film. The resistance film surfaces of the glass plate and the film are overlappingly positioned so as to face each other. Further, a spacer (not shown), such as a very small silicon rubber, is disposed between them so that when the surface (coordinate input surface) of the film is pressed the resistance films of the two are brought into contact with each other at the press point. Over all of the glass plate and the film is formed a conductive pattern as a terminal (electrode) for applying a voltage to the resistance film and measuring a potential at both ends of the resistance film.

Shown also in the figure are a press point detection circuit 22, for applying a predetermined voltage to both ends of a resistance film and measuring its potential, which detects a press point position with the indicating pen 23 on the basis of the magnitude of a measured potential, a dot-matrix type liquid crystal display board 25 which is driven by a liquid crystal driving circuit 24 and which displays numerous kinds of data, icons for use in input, and numerous kinds of messages, and a processing section 20 comprising a CPU 111, a ROM 112, and a RAM 113, which controls the input/output section and performs input and output processing on numerous kinds of information.

In the case of an electronic apparatus of this embodiment, since it does not have an input apparatus other than the input tablet 21, not only data but instructions of numerous kinds of commands, etc. are all input by using this input tablet 21.

Figure 3:
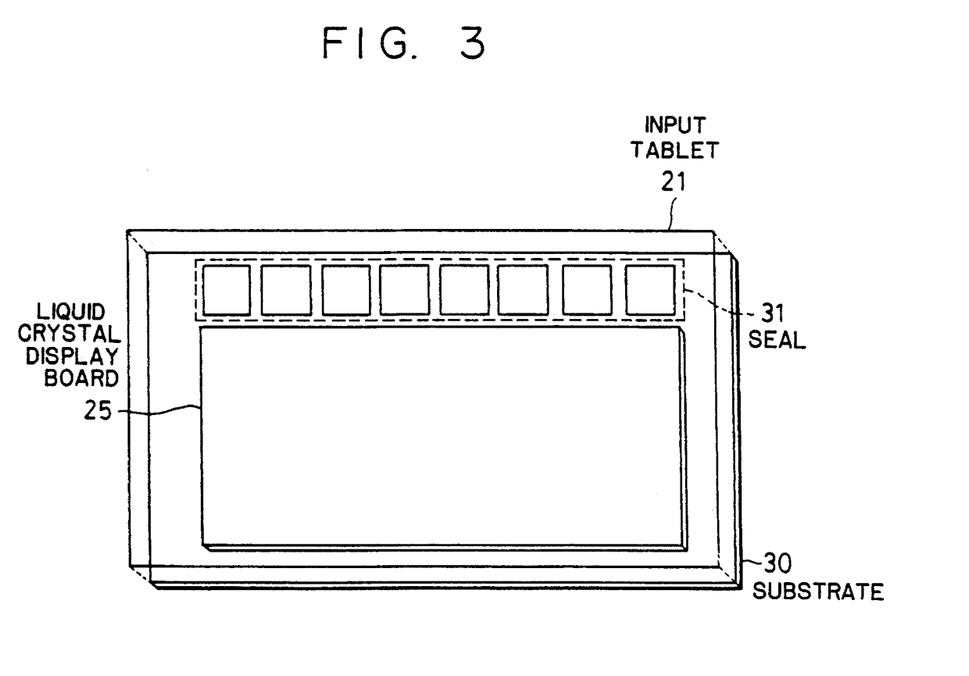
FIG. 3 is an exterior view of the input and output one-piece type apparatus.

The input tablet 21 is overlappingly positioned on the liquid crystal display board 25 and can be seen through the display of the liquid crystal display board 25, as shown in FIG. 3. A seal 31, on which a symbol for a soft switch is printed, is pasted on a substrate 30 on which the liquid crystal display board 25 and the liquid crystal driving circuit 24 (not shown in FIG. 3) are mounted. The input area of the input tablet 21 has a size which includes the liquid crystal display board 25 and the seal 31. The soft switch symbols on the seal 31, in addition to those on the display screen, can be input by pressing the input tablet 21.

Next, a case where an indicated point is input by pressing the surface of the input tablet 21 will be explained.

As shown in FIG. 4(A), let both ends of resistance films formed on the glass plate and the PET film be A, B, and C, D respectively. The resistance films are not in contact with each other at first, but if pressed by the indicating pen 23, they are brought into contact with each other at a press point P. To detect the coordinates of this P point on the X axis, as shown in FIG. 4(B), a predetermined voltage is applied between A and B beforehand, and the potential at the point P is measured on the basis of the potential at the C point (or D point).

On the other hand, to detect the coordinates of this P point on the Y axis, as shown in FIG. 4(C), a predetermined voltage is applied between C and D beforehand, and the potential of the point P is measured at the A point (or B point). The position of the indicated point P is detected by performing the above action alternately.

Figure 5:
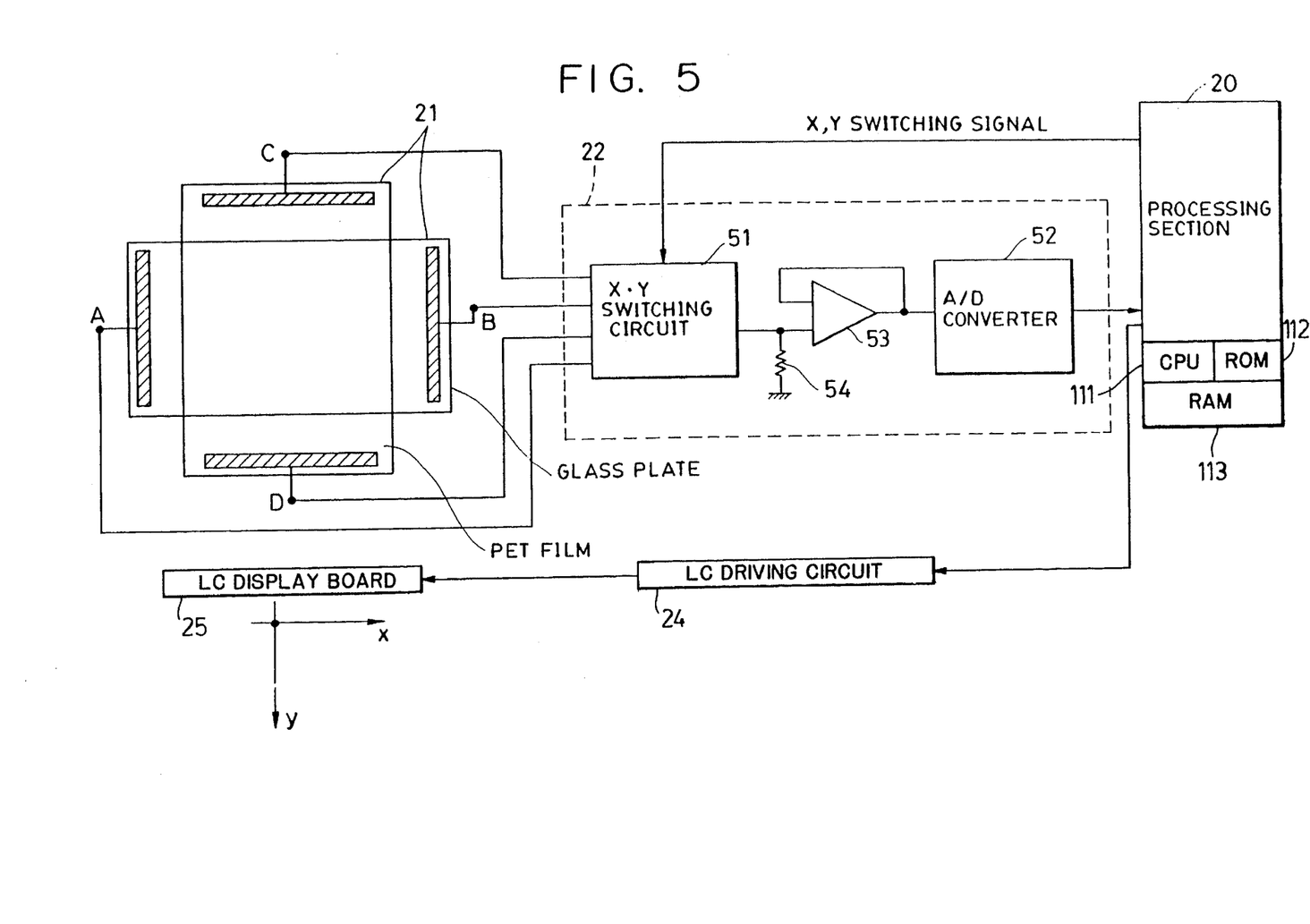
FIG. 5 is a block diagram for illustrating the schematic configuration of a press point detection circuit.
Figure 7:
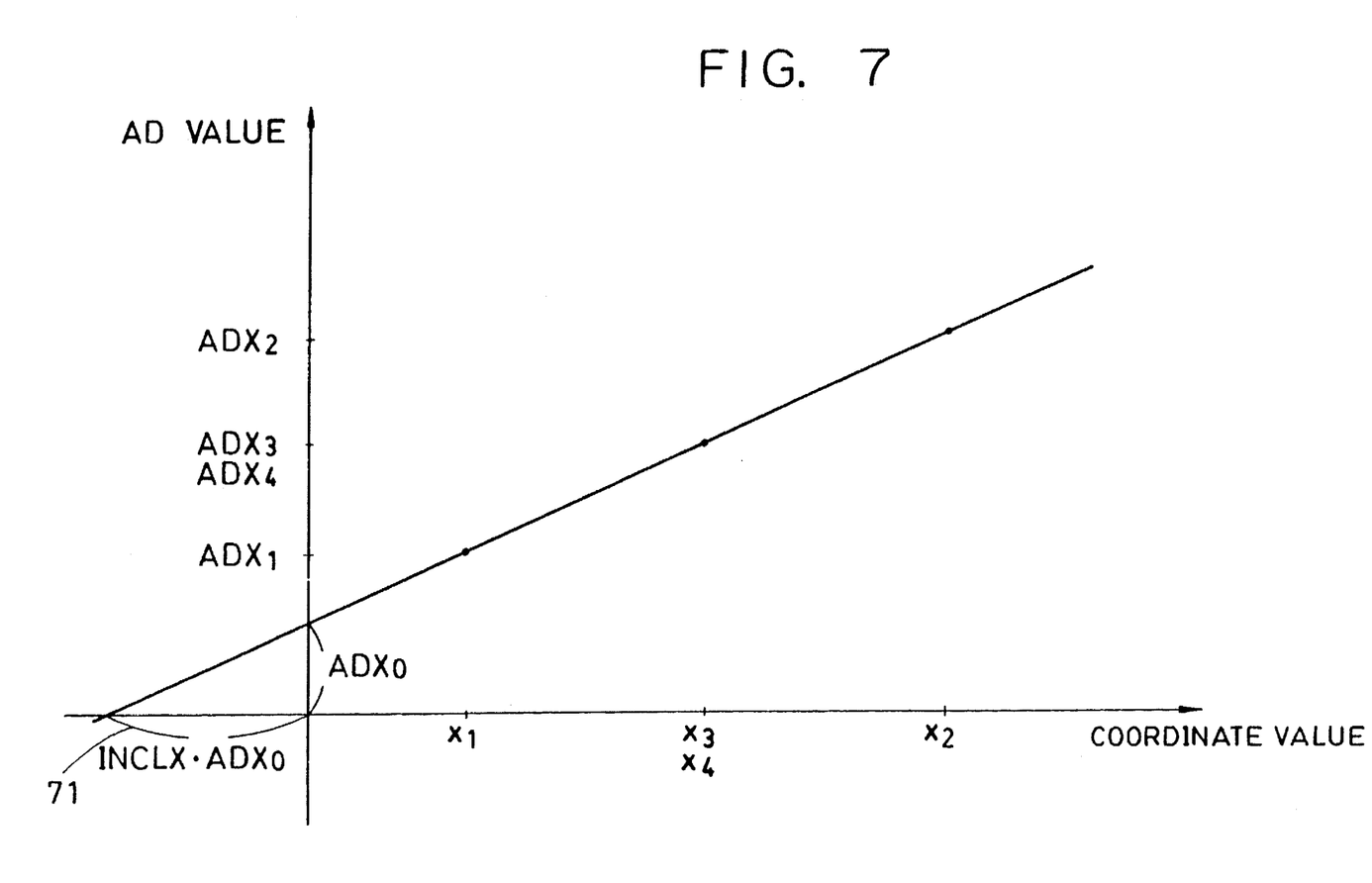
FIG. 7 is a view illustrating the relationship between AD values and coordinate values.

Explanation of the Press Point Detection (FIGS. 5 to 7)

Figure 4:
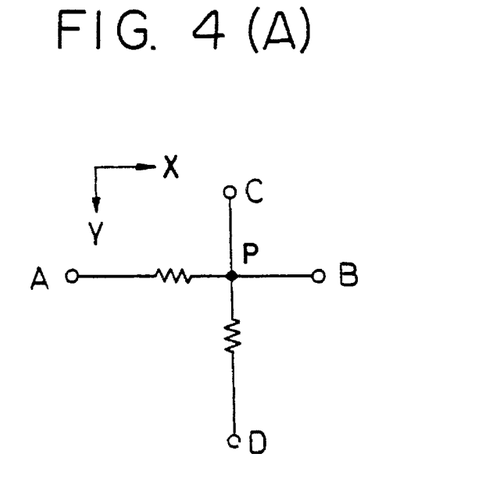

FIG. 5 is a view for explaining the configuration of a press point detection circuit 22. Shown in the figure is an X/Y switching circuit 51 for switching to detect the coordinates of either the X axis or the Y axis. Each of the terminals A to D of the resistance film shown in FIG. 4 is connected to an operational amplifier 53 via the X/Y switching circuit 51. The operational amplifier 53 is made a voltage follower, so a voltage drop across A and P, or across C and P, can be ignored. Shown also in the figure is an A/D converter for converting a voltage output from the operational amplifier 53 into digital data. The output of this A/D converter 52 is read out by the processing section 20 to detect the position of the press point P. Since the input terminal of the operational amplifier 53 has been pulled down by a resistor 54 having 1 to 2 MΩ, a ground potential is measured in the A/D converter 52 when there is no pressing.

Next, a scheme of a calibration for matching the coordinate systems of the coordinate input section (input tablet 21) and the display section (liquid crystal display board 25) will be described in detail. To make the coordinate systems in agreement, the following steps must be performed.

① Make the origins in agreement.

② Normalize the positions of the coordinates at the same unit length.

First, ② D will be explained. Unit length (i.e., length represented by one bit) should be set smaller than the display dot pitch of the liquid crystal display board 25. Here, by taking into account the resolution required for character recognition, let it be 0.1 mm. Since the position data (hereinafter called an AD value) which is output from the A/D converter 52 is not necessarily in units of 0.1 mm, the unit length must be converted to 0.1 mm by multiplying it by a certain correction coefficient.

To determine a correction coefficient, for example, four points $P_1$ to $P_4$, as shown in FIG. 6(A) may in turn be indicated by pressing and an AD value is sampled. If the AD value determined by pressing a point $P_n$ with the indicating pen 23 is denoted by ($ADX_n$, $ADY_n$),
Correction coefficient on the X axis is $$INCL\, X = \frac{P_1 P_2}{ADX_2 - ADX_1} \qquad (1)$$

Correction coefficient on the Y axis is $$\text{INCL } Y = \frac{P_3 P_4}{ADX_4 - ADX_3} \quad (2)$$

where $P_1P_2$ and $P_3P_4$ are numeric values with the distances between $P_1P_2$ and $P_3P_4$ in the units of 0.1 mm.

Next, ① will be explained. The origin is generally set at the position of the (0, 0) dot of the liquid crystal display board 25, namely, at the left upper corner of the liquid crystal display dot. Since the coordinate systems of the input tablet 21 and the liquid crystal display board 25 deviate a certain distance, the origins of them can be made in agreement by measuring the deviation amount and adding it to its AD value. If the AD value at the origin is denoted by ($ADX_o$, $ADY_o$), the coordinate value ($x_n$, $y_n$) of a point $P_n$ is as follows:

$$x_n = \text{INCL } X \cdot (ADX_n, ADX_n) = \text{INCL } X \cdot ADX_n - \text{INCL } X \cdot ADX_o \quad (3)$$

$$y_n = \text{INCL } Y \cdot (ADY_n, ADY_n) = \text{INCL } Y \cdot ADY_n - \text{INCL } Y \cdot ADY_o \quad (4)$$

The $X \cdot ADX_o$ and $Y \cdot ADY_o$ of the second term of the right side in equations (3) and (4) are deviation amounts. These of $X \cdot ADX_o$ and $Y \cdot ADY_o$ can be known by indicating, by pressing, onto the origin with the indicating pen 23, but it can also be determined from the AD values of the above-mentioned $P_1$ to $P_4$ without pressing the origin over again.

FIG. 7 is one in which the horizontal axis shows coordinate values and the vertical axis shows AD values. As apparent from this figure, the magnitude of the above-mentioned deviation amount is the length of the cut piece 71 itself on the horizontal axis. To determine this algebraically, Deviation amount on the X axis is $$\begin{aligned}\text{OFFSET } X &= -\text{INCL } X \cdot ADX_o \\ &= x_n - \text{INCL } X \cdot ADX_n\end{aligned} \quad (5)$$

Deviation amount of the Y axis is $$\begin{aligned}\text{OFFSET } Y &= -\text{INCL } Y \cdot ADX_o \\ &= y_n - \text{INCL } Y \cdot ADY_n.\end{aligned} \quad (6)$$

In practice, by taking into account an error occurring when P1 to P4 are indicated by pressing, $$\text{OFFSET } X = \frac{\sum_{i=1-4} x_i - \text{INCL } X \cdot \sum_{i=1-4} ADX_i}{4} \quad (7)$$

$$\text{OFFSET } Y = \frac{\sum_{i=1-4} y_i - \text{INCL } Y \cdot \sum_{i=1-4} ADY_i}{4} \quad (8)$$

From the above, the coordinate values of an arbitrary point $P_n$ from equations (1), (2), (7) and (8) are:

$$x_n = \text{INCL } X \cdot ADX_n + \text{OFFSET } X \quad (9)$$

$$Y_n = \text{INCL } Y \cdot ADY_n + \text{OFFSET } Y \quad (10)$$

Therefore, in the case of this embodiment, correction parameters which are calculated from the result of a calibration operation are the following four kinds: INCL X, INCL Y, OFFSET X, and OFFSET Y.

The calibration operation as mentioned above is generally performed at assembly time in a factory before shipment, so the user need not particularly be conscious of the calibration. However, after several months to several years from the date of the purchase, the resistance value of a resistance film undergoes a secular change, and coordinates deviate a little. Therefore, the user himself has to perform a calibration operation as mentioned above.

In the case of this embodiment, pressing a soft switch (calibration key 61) of the rightmost end as shown in FIG. 6(A) enables the start of a calibration operation to be instructed. However, such calibration operation is not often performed, and therefore a proper execution of the operation will not necessarily be performed. In FIG. 6(A), for example, if a point $P_5$ is erroneously pressed instead of a point $P_1$, its correction coefficient, unlike that of equation (1), is:

$$\text{INCL } X' = \frac{P_1 P_2}{ADX_5 - ADX_1} \quad (11)$$

In consequence of this, the deviation amount of the axis is:

$$\text{OFFSET } X' = \frac{\sum_{i=1-4} x_i - \text{INCL } X' \cdot \sum_{i=2-5} ADX_i}{4} \quad (12)$$

Such calibration operation is primarily performed to match coordinate systems. If an indication position is mistaken as mentioned above, in consequence, there is a possibility in that the deviation or distortion of coordinates are made larger than before calibration.

In the case of the prior art mentioned above, even if the system enters such a situation, the calibration operation can be started again by pressing the calibration button of the keyboard 91, so no problem is posed if the operation is correctly performed the second time.

However, in the case of an electronic apparatus having no input section other than the input tablet 21 as in this embodiment, even if the soft switch furtherest to the right (the calibration key 61) shown in FIG. 6(A) is pressed with the indicating pen 23 to start the calibration operation again, this input is not accepted since the coordinate system of the input tablet 21 deviates greatly. Therefore, the fact that the region of the calibration key 61 of the input tablet 21 is indicated with the indicating pen 23 cannot be recognized, with the result that the calibration operation cannot be instructed to be started. Needless to say, this makes an ordinary use of the apparatus difficult.

Accordingly, in one embodiment of the present invention, the following configuration is adopted. That is, after the correction parameter is calculated, it is not definitely determined instantly. At first, as shown in FIG. 6(B), a message for prompting the operator to again press the calibration key 61, which is a soft switch for calibration, is displayed. At this time, by using a newly calculated correction parameter candidate, the position of the coordinates pressed with the indicating pen 23 is calculated. A check is made to see whether or not the coordinate value thus obtained is a coordinate value corresponding to the region of the soft switch 61 for use in calibration. In other words, when the fact that the calibration soft switch 61 is pressed can be recognized, then, the correction parameter candidate is determined as a formal correction parameter.

On the other hand, when a coordinate value corresponding to the region of the calibration soft switch 61 cannot be obtained, the correction parameter candidate is not determined, and the content of the correction parameter remains as before. That is, it follows that only in the state in which the calibration operation can be instructed to start when the calibration soft switch 61 is pressed, is the calculated correction parameter adopted.

Figure 1:
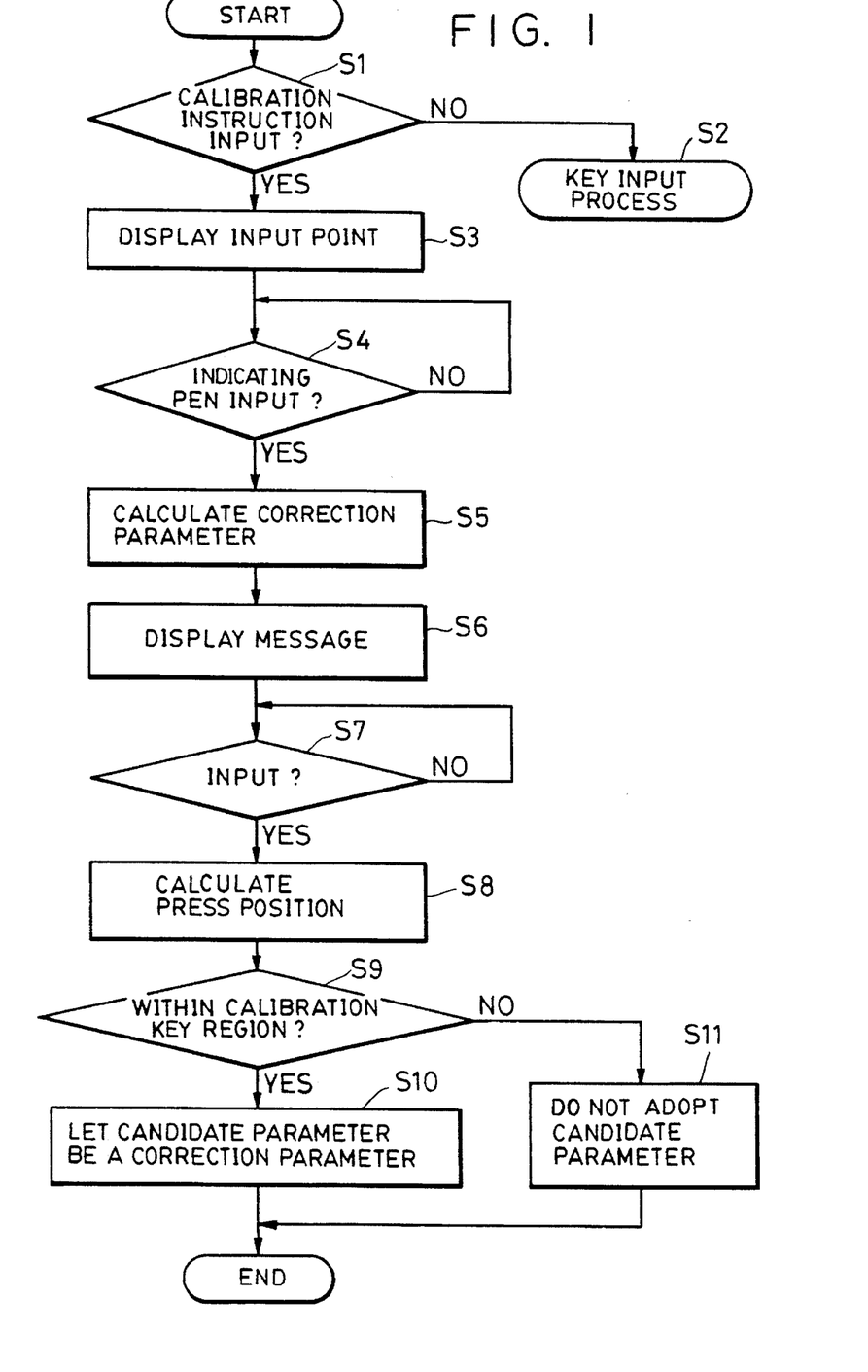
FIG. 1 is a flowchart for illustrating a calibration process in the processing section of an electronic apparatus in an embodiment of the present invention.
Figure 6:
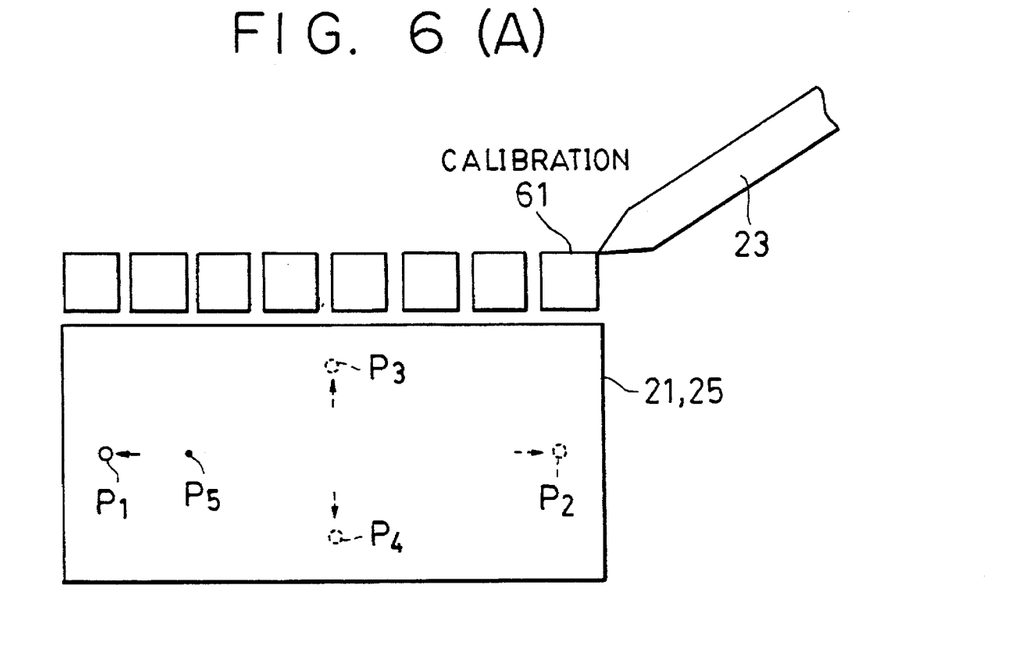
FIGS. 6(A) and 6(B) are views explaining the way to display/handle a screen at calibration operation time in the embodiment.

Explanation of the Calibration Process (FIGS. 1 and 6)

The above process will be explained with reference to the flowchart of FIG. 1. The control program for executing this process is stored in the ROM 112 of the processing section 20.

When the input surface of the input tablet 21 is pressed with the indicating pen 23, the operation proceeds to step S1 where the region pressed with the indicating pen 23 is determined. In step S1, it is judged whether or not the region of the calibration key 61 is pressed with the indicating pen 23. If there is no instruction from the soft switch 61, the operation proceeds to step S2 where a process corresponding to the pressed key or inputting of the other coordinate values is performed.

When the calibration key 61 is pressed, the operation proceeds to step S3 where, for example, as shown in FIG. 6(A), an indicated point P (P1 to P4) is displayed on the liquid crystal display board 25. Next, the control proceeds to step S4 where the system waits for the operator to indicate each point. In this way, the system waits for the operator to press these displayed points, and after this is completed, the operation proceeds to step S5. In this step, the pressed coordinate value is calculated, and a correction value for calculating a pressed coordinate position is determined on the basis of the deviation with respect to a corresponding position (the position of the point $P_1$, etc.) on the screen. Then, this value is stored in the RAM 113 as a correction parameter candidate.

Next, in step S6, the message 62, for example, that shown in FIG. 6(B), is displayed on the liquid crystal display board 25 so as to prompt the operator to press the calibration key 61, which is a soft key. In step S7, the system waits for a key input through the use of the indicating pen 23. If an input by the indicating pen 23 occurs, the operation proceeds to step S8 where the coordinate value of the position at which the input tablet 21 is pressed is calculated by using the correction parameter candidate stored in step S5.

Next, the operation proceeds to step S9 where it is determined whether or not the coordinate value calculated by using the correction parameter candidate corresponds to the position of the calibration key 61. When the coordinate value calculated by using the correction parameter candidate is within the region of the calibration key 61, the operation proceeds to step S10 where the correction parameter candidate is determined as the correction parameter during coordinate value calculation time. That is, this correction parameter is used during coordinate value calculation time after this determination.

On the other hand, when the coordinate value calculated in step S9 does not correspond to the region of the calibration key 61, the operation proceeds to step S11 where the correction parameter candidate is not adopted, so the correction parameter is not updated. In this case, the content of the correction parameter is left unchanged, that is, as it was before the calibration operation, and the system waits for a correct operation to be performed.

As set forth hereinabove, according to this embodiment, since the correction parameter remains undetermined when the user has performed an erroneous operation during calibration operation time, the present invention has an advantage in that the input tablet can be prevented from going into an inoperable state after its input coordinates deviate greatly or are distorted.

Figure 8:
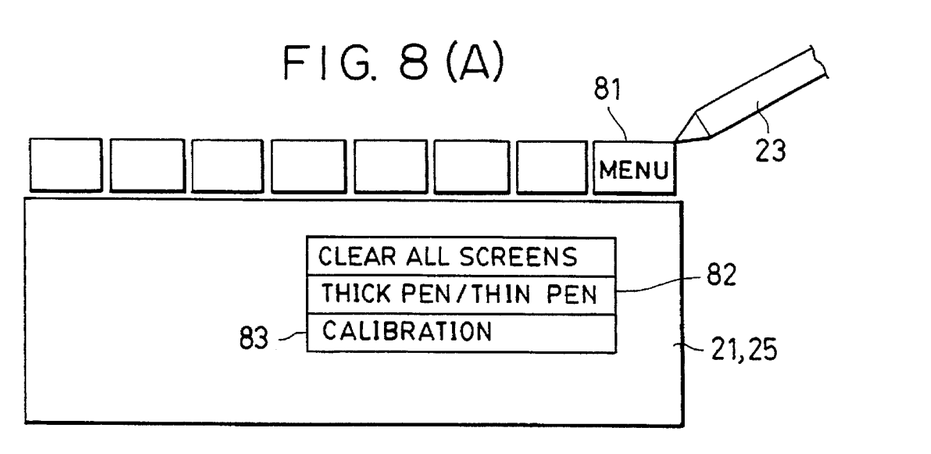
FIGS. 8(A) to 8(C) are views explaining the way to display/handle a screen at calibration operation time in another embodiment.

Another Embodiment (FIG. 8)

In order to instruct the calibration operation to start, an ordinary pop-up menu or a pull-down menu, rather than a separate soft switch as mentioned above, is provided.

For example, as shown in FIG. 8(A), when a soft switch of the "Menu" 81 is pressed with the indicating pen 23, a menu 82 having three soft switches, "Clear entire screen" "Thick pen/thin pen" and "Calibration" is pop-up displayed on the liquid crystal display board 25. At this point, to instruct the calibration operation to start, the surface within the frame 83 is indicated by pressing continuously. The calibration operation at this instance is, for example, as explained with reference to FIG. 6, to determine the correction parameter candidate by displaying points P on the screen 25 and specifying each point with the indicating pen 23.

When the correction parameter candidate is calculated in this way, the region of the "Menu" 81 is pressed in accordance with the instruction in FIG. 8(B). Then, the surface of the soft switch "Calibration" within the frame 83 is pressed in accordance with the display of FIG. 8(C). Only when the coordinate value calculated by each input pressed corresponds to the region of the soft switch of the "Menu" 81 and the surface of the soft switch "Calibration" within the frame 83, is the correction parameter candidate definitely determined as the correction parameter. Of course, if the adoption of this correction parameter candidate is determined by only repressing within the "Menu" 81, the advantage of the present invention is not lost.

As described above, the predetermined region and its pressed input referred to in the present invention are not limited to one pressing point. This region also includes a case where a plurality of pressing points are in turn pressed, or where they are all pressed at the same time.

In the above-mentioned embodiment, the explanation was made taking one of the resistance file system used as a coordinate input section as an example. However, the present invention is not limited to this embodiment, and it goes without saying that any of those apparatuses which accept coordinate inputs by indicating on a tablet surface with a dedicated pointer an ordinary writing tool, or a finger can be widely used irrespective of their principles or systems.

As set forth hereinabove, according to the present invention, since a correction parameter remains undetermined when the user has performed an erroneous operation during calibration operation time, the calibration operation can be safely updated and an apparatus can be prevented from becoming inoperable due to an erroneous operation.

In addition, since the instruction to recalibrate can be given at any time regardless of the success or failure of the calibration, the user can perform the calibration operation without any fear of making making errors and feeling at ease.

Further, the present invention has an advantage in that, after it is determined whether or not a correction parameter is adopted, the determined result is displayed, and thus the user can recognize the success or failure of the up-to-date calibration operation.

As many apparently widely different embodiments of the present invention can be made without departing from the spirit and scope thereof; it is to be understood that this invention is not limited to the specific embodiments thereof except as defined in the appended claims.

What is claimed is:

1. A coordinate input apparatus, comprising:
   a coordinate input member having a first coordinate system for inputting a coordinate value of an indicated position thereon indicated at a desired position with an indicating pen;

display means having a second coordinate system for displaying in dot form the indicated position of said indicating pen on said coordinate input member;

instruction means for instructing a calibration process for matching the coordinate systems of said coordinate input member and said display means when a specific region on said coordinate input member has been indicated by said indicating pen;

display controlling means for displaying a pattern by said display means to be indicated by said indicating pen, which is necessary to derive a correction parameter for matching the coordinate systems when said instruction means has instructed;

correction parameter derivation means for deriving a correction parameter on the basis of a prescribed indication by said indicating pen at the position on said coordinate input member corresponding to said pattern;

prompting means for prompting an operator to indicate a specific region on said coordinate input member by said indicating pen again after a correction parameter is derived by said correction parameter derivation means;

judgment means for Judging whether the indicated position coordinate by the indicating pen belongs to said specific region on said coordinate input member on the basis of the indicated position coordinate value derived by using the correction parameter derived by said correction parameter derivation means; and coordinate value derivation means for deriving the coordinate value of the indicated position by said indicating pen using the correction parameter derived by the correction parameter derivation means when said judgment means judges that the indicated position coordinate by the indication pen belongs to the specific region.

2. A coordinate input apparatus according to claim 1, wherein said coordinate input section is made of a transparent glass plate and said display means is a liquid crystal indicator positioned directly under the glass plate.

3. A coordinate input apparatus, comprising:

a coordinate input member including a glass plate having a first coordinate system for inputting a coordinate value of an indicated position indicated at a desired position with an indicating pen;

display means, including a screen, having a second coordinate system and positioned directly under the glass plate, for displaying in dot form the indicated position of said indicating pen on said coordinate input member;

instruction means for instructing a calibration process for matching the coordinate systems of said coordinate input member and said display means when an indication by said indicating pen has been effected in correspondence with a specific region of said display means;

display controlling means for displaying a pattern by said display means to be indicated by said indicating pen, which is necessary to derive a correction parameter for matching the coordinate systems when said instruction means has instructed a calibration process;

correction parameter derivation means for deriving a correction parameter an indication by said indicating pen at the position on said coordinate input member corresponding to said pattern;

prompting means for prompting an operator to indicate a specific region on said coordinate input member by said indicating pen again after a correction parameter is derived by said correction parameter derivation means;

judging means for judging whether the indicated position coordinate by the indicating pen belongs to said specific region on said coordinate input member on the basis of the indicated position coordinate value derived by using the correction parameter derived by said correction parameter derivation means; and coordinate value derivation means for deriving the coordinate value of the indicated position by said indicating pen using the correction parameter derived by the correction parameter derivation means when said judging means judges that the indicated position coordinate by the indicating pen belongs to said specific region.

4. A coordinate input apparatus according to claim 3, wherein said display means is a liquid crystal indicator.

* * * * *

UNITED STATES PATENT AND TRADEMARK OFFICE
CERTIFICATE OF CORRECTION

PATENT NO. : 5,471,226
DATED : November 28, 1995
INVENTOR(S) : NORIYUKI SUZUKI ET AL.

It is certified that error appears in the above-indentified patent and that said Letters Patent is hereby corrected as shown below:

<u>TITLE PAGE, ITEM [56], References Cited</u>

Foreign Patent Documents, "62-47725 7/1985 Japan" should read --60-247725 12/1985 Japan--.

<u>COLUMN 1</u>

Line 11, "can" should read --can be--.

<u>COLUMN 4</u>

Line 48, "D" should be deleted.

<u>COLUMN 8</u>

Line 49, "making making" should read --making--.

UNITED STATES PATENT AND TRADEMARK OFFICE
CERTIFICATE OF CORRECTION

PATENT NO. : 5,471,226
DATED : November 28, 1995
INVENTOR(S) : NORIYUKI SUZUKI ET AL.

It is certified that error appears in the above-indentified patent and that said Letters Patent is hereby corrected as shown below:

<u>COLUMN 9</u>

Line 22, "Judging" should read --judging--.

Signed and Sealed this

Eleventh Day of June, 1996

Attest:

BRUCE LEHMAN

*Attesting Officer*  *Commissioner of Patents and Trademarks*